(12) United States Patent
Flamanc et al.

(10) Patent No.: US 9,075,149 B2
(45) Date of Patent: Jul. 7, 2015

(54) DETECTOR WITH A CONICAL SCINTILLATOR

(75) Inventors: Jeremy Flamanc, Dungis (FR); Marie-Virginie Ehrensperger, Paris (FR); Michele Schiavoni, Paris (FR)

(73) Assignee: Saint-Gobain Cristaux Et Detecteurs, Courbevoie (FR)

( * ) Notice: Subject to any disclaimer, the term of this patent is extended or adjusted under 35 U.S.C. 154(b) by 0 days.

(21) Appl. No.: 13/553,499

(22) Filed: Jul. 19, 2012

(65) Prior Publication Data

US 2013/0020488 A1   Jan. 24, 2013

(30) Foreign Application Priority Data

Jul. 19, 2011 (FR) ...................................... 11 56533

(51) Int. Cl.
G01T 1/20 (2006.01)
(52) U.S. Cl.
CPC ................. G01T 1/20 (2013.01); G01T 1/2018 (2013.01)
(58) Field of Classification Search
CPC ..... G01T 1/2002; G01T 1/202; G01T 1/2018; G01T 1/20; G01T 1/1642; G01T 1/1644
USPC ........................................................ 250/368
See application file for complete search history.

(56) References Cited

U.S. PATENT DOCUMENTS

| | | | |
|---|---|---|---|
| 3,828,190 A * | 8/1974 | Dahlin et al. ................. | 250/308 |
| 5,241,180 A | 8/1993 | Ishaque et al. | |
| 5,753,918 A | 5/1998 | Pandelisev | |
| 7,067,815 B2 | 6/2006 | Dorenbos et al. | |
| 7,067,816 B2 | 6/2006 | Dorenbos et al. | |
| 7,332,028 B2 | 2/2008 | Iltis et al. | |
| 7,521,685 B2 | 4/2009 | Hennessy et al. | |
| 7,608,201 B2 | 10/2009 | Iltis | |
| 7,670,578 B2 | 3/2010 | Iltis | |
| 7,683,336 B2 * | 3/2010 | Ramsden et al. ............. | 250/368 |
| 7,767,975 B2 | 8/2010 | Flamanc et al. | |
| 2002/0117625 A1 | 8/2002 | Pandelisev | |
| 2005/0188914 A1 | 9/2005 | Iltis et al. | |
| 2006/0104880 A1 | 5/2006 | Iltis | |
| 2007/0241284 A1 | 10/2007 | Iltis | |
| 2009/0065704 A1 * | 3/2009 | Heringa et al. .......... | 250/370.11 |
| 2010/0230605 A1 * | 9/2010 | Partouche-Sebban et al. ............................. | 250/368 |

(Continued)

FOREIGN PATENT DOCUMENTS

FR   2 948 379 A1   1/2011
GB   1335451 A     10/1973

OTHER PUBLICATIONS

French Search Report from Application No. 1156533 dated Mar. 8, 2012, 9 pgs.

(Continued)

*Primary Examiner* — David Porta
*Assistant Examiner* — Mindy Vu
(74) *Attorney, Agent, or Firm* — Abel Law Group, LLP

(57) ABSTRACT

A detector of ionizing radiation comprises a photodetector and a scintillator in the shape of truncated cone comprising a large base, a small base and a lateral surface, the large base of the scintillator being coupled to the photodetector, any half-angle at the apex of the cone being in the range between 5° and 35°, the lateral face being coated with a black coating. The detector in accordance with an embodiment can produce a very short pulse.

18 Claims, 1 Drawing Sheet

(56) References Cited

U.S. PATENT DOCUMENTS

2011/0017911 A1   1/2011   Flamanc et al.
2013/0087713 A1*  4/2013   Toyama et al. ............... 250/368

OTHER PUBLICATIONS

McGervey, J. D. et al., "Time Resolution Measurements with an Improved Discriminator and Conical Scintillators," Nuclear Instruments and Methods, vol. 143, No. 3, Jun. 15, 1977, pp. 435-439, XP0001425715.

Klunder, G. L, et al., "Analysis of Fission Products Using Capillary Electrophoresis with On-line Radioactivity Detection," Analytic Chemistry, vol. 69, No. 15, Aug. 1, 1997, pp. 2988-2993, XP0001182280.

Hine, G. J. et al., "Conical Plastic Scintillators Show Total Gamma Absorption," Nucleonics, Sep. 1, 1960, pp. 92-100, XP001433702.

* cited by examiner

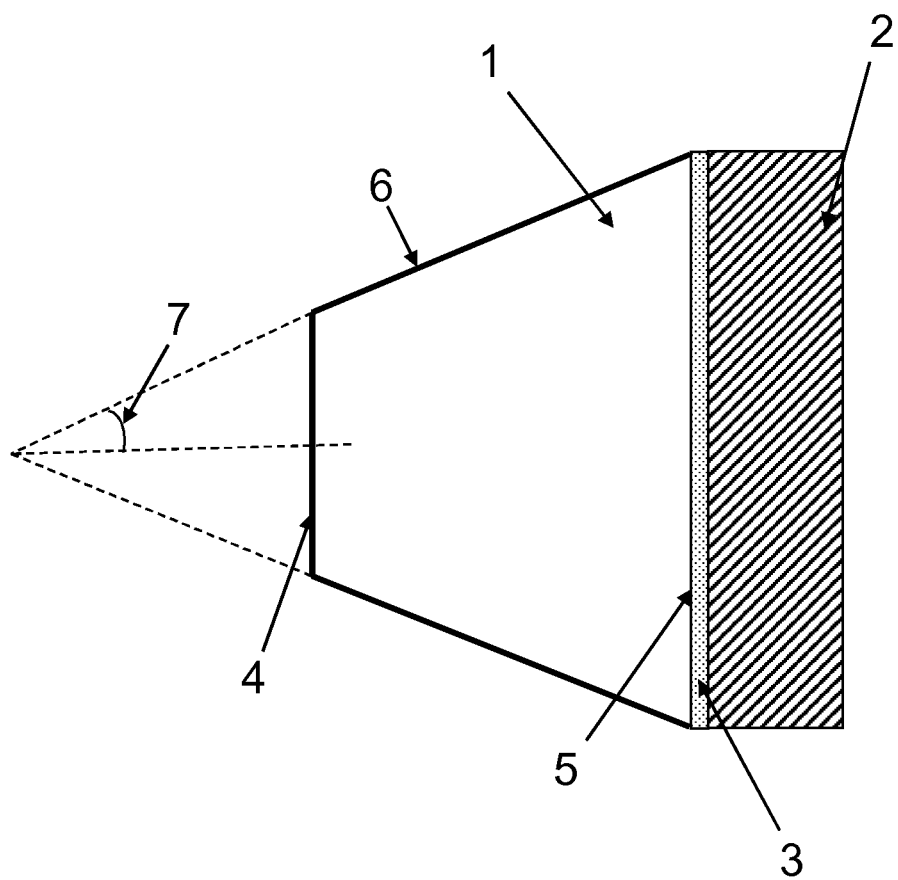

DETECTOR WITH A CONICAL SCINTILLATOR

CROSS REFERENCE TO RELATED APPLICATION(S)

The present application claims priority from French Application No. 1156533, filed Jul. 19, 2011, which application is incorporated by reference herein in its entirety.

FIELD OF THE INVENTION

The invention relates to the field of scintillator materials and detectors of ionizing radiation.

DESCRIPTION OF THE RELATED ART

Ionizing radiation (which includes ionizing particles such as notably protons, neutrons, electrons, alpha particles and X-rays or gamma rays) are usually detected by means of scintillator materials which convert the incident ionizing radiation into visible light, which light is then transformed into an electrical signal by means of a photomultiplier. The scintillator material can be a crystal, notably a single crystal, a ceramic, a powder, etc. In the case of the detection of X-rays or gamma rays, the scintillators used can notably be a single crystal doped with NaI, CsI, or a halogenide of lanthanum. Crystals comprising a halogenide of lanthanum require particular precautions owing to their hygroscopic nature.

Detector or detection system is understood to mean the assembly of a scintillator material optically coupled with a photodetector, where the assembly can be encapsulated within a housing.

Detection systems may be used in, amongst others, the field of medical imaging scanners, airport gantries, oil prospection. The transformation of the light emitted by the crystal into an electrical signal is effected by a photodetector. The photodetector can, amongst others, be:
  a photomultiplier or photomultiplier tube assembly (PMT for PhotoMultiplier Tube),
  a multi-anode photomultiplier or multi-anode photomultiplier tube assembly (PS PMT for Position Sensitive Photomultiplier), or
  a photodiode, a photodiode assembly, or a photodiode matrix.

The term photodiode comprises, amongst others, PN photodiodes, PiN photodiodes, avalanche photodiodes (APD for Avalanche PhotoDiode), avalanche photodiodes operating in Geiger mode (named for example Silicon PhotoMultiplier (SiPM), or Multichannel Photon Counter (MPPC)), Silicon Drift Diode (SDD), or again Silicon Strip Detectors (SSD).

A detector allows ionizing radiation to be detected (presence of a current at the photodetector output), to be identified (the higher the resolution in energy of the detection system, the easier this will be) and sometimes to be time stamped (the higher the resolution in time of the detection system, the more precise this will be).

In the field of medical imaging or certain physics experiments (for example the calorimeter, designed for the detection of the secondary particles resulting from the impact of primary particles), the aim is to determine the moment of the interaction of the incident radiation in the scintillator. The time stamping of the interaction of the ionizing radiation in the scintillator can be used to localize the source of the ionizing radiation. Indeed, the time stamping with respect to a reference provides the "time of flight" for the ionizing radiation, in other words the period of time between its creation and its arrival at the detection system. As the speed of the radiation is furthermore known (for example the speed of the light in the case of gamma radiation), the distance between the source of the ionizing radiation and the detection system can be deduced. The reference may be provided by a particle emitted in coincidence with the ionizing radiation detected. The position of the source of the gamma photon can thus be localized in three dimensions. The gamma rays of no interest can also be rejected (for example those that have a longer time of flight than the gamma rays coming from the interaction with the object of interest).

A light pulse is a quantity of visible photons coming from the scintillator material as a function of time resulting from an interaction with an incident ionizing particle. An electrical pulse is the quantity of electrical charge as a function of time coming from the conversion of the light pulse by the photodetector.

In order to perform the time stamping, a light pulse of short duration is needed, typically between a few tens of picoseconds and a few tens of nanoseconds. This short light pulse is subsequently converted into a short electrical pulse and amplified by the photodetector (as long as the photodetector is optimized for speed, in other words that it does not broaden the duration of the light pulse during the conversion into an electrical pulse and during its amplification). The short electrical pulse coming from the photodetector is then processed by a dedicated measurement system.

A first advantage of having a short pulse is therefore to time stamp an event with a high precision. Indeed, the pulses are processed by the electronics as a function of their rise time, of their fall time, and of their amplitude, and the time stamping is all the more precise the shorter these times and the higher the amplitude.

A second advantage of having short pulses is to be able to use high-activity sources, thus for example reducing the acquisition time. The short pulses have less risk of overlapping one another than long pulses. Pulses that overlap one another do not contribute to the useful signal for the system, and slow down the acquisition.

Scintillators are most often of cylindrical shape, one of the two plane faces of the cylinder being coupled to the photodetector. Scintillators can have other shapes, such as conical. A conical scintillator can have a small base directed toward the photoreceiver. This shape allows the detection volume to be increased while still using a small photodetector. A scintillator may be composed of an assembly of several truncated cones. The ends of the scintillator are small bases of truncated cones directed toward light guides.

A scintillator can have truncated cones, wherein the half-angle at the apex of the cones is very small, being around 4°. The use of the scintillator is aimed at rigidly-mounted detectors which are above all used in the framework of oil prospection, which detectors do not require any particular time performance. Sometimes, the small base of the cone is placed on the side of the photodetector.

BRIEF DESCRIPTION OF THE DRAWINGS

Embodiments are illustrated by way of example and are not limited by the accompanying figures.

FIG. 1 illustrates a crystal in accordance with an embodiment described herein coupled to a photodetector with a coupling agent in accordance with an embodiment describe herein.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

It has now been discovered that the light pulse properties may also be influenced by properties of shape, of surface preparation and of coating of the scintillator.

In accordance with embodiments described herein, it has now been discovered that a shape of crystal in the form of a truncated cone with a relatively high cone angle and whose largest base is oriented toward the photodetector, the lateral surface of the truncated cone being coated with a black coating, produces significantly shorter pulses than a cylinder or a truncated cone oriented in the opposing direction. Such embodiments offer a significant advantage for applications requiring a good time resolution of the scintillator where the time stamping of the interaction of the ionizing radiation in the scintillator is used to localize the source of the ionizing radiation. In these applications, the ionizing source is located between two detectors each comprising a scintillator and the exact position of the source is determined thanks to the determination of the time taken by the ionizing radiation to reach each of the scintillators then to be detected by the light detector coupled to each scintillator. The better is the time resolution of the scintillator, the higher is the precision of the localization of the source.

The external surface of the crystal has the shape of a truncated cone. Cone is understood to mean cones of revolution but also those whose base has any given shape such as pyramidal cones. It is recalled that a cone is a controlled surface defined by a straight line called generatrix, passing through a fixed point called apex and a variable point describing a plane closed curve, called directrix curve. A controlled surface is a surface through each point of which passes a straight line, called generatrix, contained in the surface. Generally, the truncated cone corresponding to the external shape of the crystal has an axis of symmetry passing through the apex of the cone and perpendicular to its large base.

Thus, embodiments described herein relate first of all to a detector of ionizing radiation comprising a scintillator in the shape of a truncated cone and a photodetector, the scintillator comprising a large base, a small base and a lateral surface, the large base of the truncated cone of the scintillator being coupled to the photodetector, any half-angle at the apex of the truncated cone of the scintillator being in the range of 5° to 35° and, in particular, 15° to 25°, the lateral surface being coated with a black coating. The truncated cone is composed of a large base (coupled to the photodetector), of a small base and of a lateral surface (between the two bases). The large base and the small base are substantially parallel to one another. In a particular embodiment, the distance between the bases is less than the diameter of the large base. If the cone is a cone of revolution, any half-angle at the apex has the same value. If the cone is a pyramidal cone, there are several half-angles at the apex, but in accordance with embodiments described herein all the half-angles at the apex are within the range of half-angles given hereinabove.

For a constant distance between truncated cone bases and for a constant coupling surface area to the photodetector, the counterpart of a larger angle at the apex is a reduction in the volume of the scintillator that decreases its stopping power for the ionizing radiation. The loss of volume of the scintillator due to the angle may be compensated by increasing the diameter of the scintillator.

For the same scintillator volume (hence by increasing the diameter of the large base of the scintillator at the same time as the angle of the truncated cone increases), the pulse remains shorter when the scintillator is in the shape of an open truncated cone (large base coupled to the photodetector) with respect to a scintillator of the same volume but cylindrical, and even more so with respect to a scintillator whose small base is coupled to the photodetector (closed configuration). A truncated-cone crystal whose large base is coupled to the photodetector is faster than a cylindrical crystal, for an equal volume and equal distance between bases of scintillators.

It has been discovered that the treatment of the surfaces of the scintillating crystal (or the surface finishing) have a significant effect on the duration of the light pulse and on the quantity of light extracted from the crystal. Depending on the priority given to the duration of the pulse, to the rise time of the pulse, or to the quantity of light integrated in the pulse, combinations of surface finishing are possible. For example, a cylindrical crystal all of whose faces are polished has one component (part of the emitted photons) that is very fast (faster than if the surfaces were diffusing), and one component trapped within the scintillator by total internal reflection. In the case of a truncated cone scintillator, polished faces also generate a pulse of light that is shorter than an identical scintillator with diffusing surfaces, but in addition, there is no trapped light, which is advantageous since the quantity of light received by the photodetector is greater.

A diffusing surface state is obtained by rubbing a surface with an abrasive material, for example sandpaper. A silk material onto which an abrasive powder is first of all deposited, such as alumina powder, may also be used. The polished surface state is obtained with a finer abrasive (for example diamond-loaded powder of maximum size of 4 µm, or else with a maximum size of 3 µm or even a maximum size of 2 µm).

It has also been discovered that the quantity of light extracted from the crystal and which reaches the photodetector via the large base which is coupled to it is greater with a truncated-cone crystal than with a cylindrical crystal, especially for a polished surface state.

It has also been discovered that a black coating (such as black paint) applied to the lateral surface of the scintillator, or even to all its surfaces aside from that coupled to the photodetector, decreased the duration of the light pulses. However, this is to the detriment of the quantity of light reaching the photodetector.

The black coating may or may not be in optical contact with the crystal. In the case of optical contact, the light only sees a single interface between the crystal and the coating. Such a contact is generally obtained by application of a paint with good adhesion to the crystal. In the case of a black coating not in optical contact, the light sees a film of gas (the ambient gas surrounding the crystal) and hence two interfaces between the crystal and the coating. This is the situation when a black film is applied in contact with the crystal without any particular adhesion.

A black coating providing an optical contact may be applied for example by the method taught in US 2011/0017911, which is incorporated herein in its entirety. Table 1 compares the effect of a black coating with a white diffusing coating of PTFE in the case of a detector in accordance with an embodiment whose half-angle at the apex is 22.5°. The coated faces are the lateral surface and the surface opposite to that coupled to the photodetector.

In the framework of the present application, when a surface is polished and coated with a black coating, the polishing has been practiced on the scintillator prior to the deposition of the coating. It is not therefore the coating that is polished, but the scintillator under the coating.

TABLE 1

| Surface state | Coating | Characteristic time | Quantity of light |
|---|---|---|---|
| diffusing | faces coated with PTFE | 1.1 ns | 96% |
| | black painted faces | 0.3 ns | 31% |
| polished | faces coated with PTFE | 0.6 ns | 96% |
| | black painted faces | 0.3 ns | 42% |

Table 1 presents the influence of the shape of the crystal (single crystal of lanthanum bromide doped at 4% by mole with cerium bromide) on the exit characteristic time of the photons of light, this characteristic time corresponding to the time after which 63% of the photons have exited the crystal via the face coupled to the photodetector. The shorter is this characteristic time, the better will be the time resolution of the scintillator. A crystal in accordance with the embodiment whose faces not coupled to the photoreceiver are coated with a black coating has a much faster characteristic time (lower value) than the same crystal with lateral faces and placed opposite to that coupled to the photodetector coated with PTFE. In addition, polished faces improve the light intensity.

Thus, in accordance with embodiments described herein, the scintillator has its lateral surface coated with a black coating, and can even have all its surfaces coated with a black coating except for the face coupled to the photodetector.

It has also been discovered that, in the case of the truncated-cone crystal, a polished surface state accorded it a higher speed. Thus, in accordance with embodiments described herein, the scintillator can have at least its lateral surface polished and even have all its surfaces polished.

The crystal is made of a scintillating material such as a rare earth halogenide, lutetium orthosilicate (LSO), lutetium yttrium orthosilicate (LYSO), sodium iodide, barium fluoride, calcium fluoride, bismuth germanium oxide BGO, an elpasolite, an alkaline rare earth iodide (such as $K_2LaI_5$). These compounds are generally doped. A rare earth halogenide such as $LaCl_3$ or $LaBr_3$ can be doped with cerium; LSO or LYSO can be doped with cerium and where appropriate co-doped with Ca or Mg; sodium iodide can be doped with Tl.

FIG. 1 illustrates a crystal 1 in accordance with an embodiment as described herein coupled with a photodetector 2 with a coupling agent 3, such as a grease. This crystal is in the shape of a truncated cone and comprises a small base 4 and a large base 5 coupled to the photodetector (configuration referred to as "open configuration"). In the embodiment as illustrated, the distance between the small and the large base is less than diameter of the large base. The lateral surface 6 and the small base 4 of the truncated cone are covered with a black coating. Dashed lines extend the lateral wall of the truncated cone in order to be able to visualize the half-angle at its apex 7.

The embodiments described herein can be used for a method to detect ionizing radiation, the ionizing radiation penetrating via the small base of the scintillator of the detector as described herein, the detector comprising a device to amplify the electrical signal delivered by the photodetector, the electrical signal being used to detect the ionizing radiation. Notably, when all the surfaces of the scintillator are polished, the position of the interaction of the ionizing radiation in the scintillator can be localized.

The embodiments described herein can be used for a method of performing a time stamping of the interaction of the ionizing radiation in the scintillator, the ionizing radiation penetrating via the small base of the scintillator of the detector as described herein, the detector comprising a device to amplify the electrical signal delivered by the photodetector, electrical signal being used to date stamp the interaction of the ionizing radiation in the scintillator.

The scintillator coated with a black coating is particularly suited for equipping the detector with devices requiring the determination of the position of an interaction of an energetic particle (gamma, neutron, alpha) in the scintillator such as: gamma-ray telescope, Associated Particle Detector, Associated Particle Imager, photo-neutron detector.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The invention claimed is:

1. A detector of ionizing radiation comprising a photodetector and a scintillator in the shape of a truncated cone comprising a large base, a small base and a lateral surface, wherein the large base of the scintillator is coupled to the photodetector, and in that any half-angle at the apex of the cone is in the range of 5° to 35°, the lateral surface is a polished surface, and a black coating, is in optical contact with the polished surface and the small base of the scintillator, and the small base has a flat surface.

2. The detector as claimed in claim 1, wherein in that any half-angle at the apex of the cone of the scintillator is in the range of 15° to 25°.

3. The detector as claimed in claim 1, wherein all the surfaces are polished.

4. The detector as claimed in claim 3, wherein all the surfaces are coated with a black coating except for the face coupled to the photodetector.

5. A method of detecting ionizing radiation, wherein the ionizing radiation penetrates via the small base of the scintillator of the detector in claim 3, the detector comprising a device to amplify the electrical signal delivered by the photodetector, said electrical signal being used to detect the ionizing radiation, and positions of interactions of the ionizing radiation in the scintillator are localized.

6. The detector as claimed in claim 1, wherein all the surfaces are coated with a black coating except for the face coupled to the photodetector.

7. The detector as claimed in claim 1, wherein the distance between the bases is less than the diameter of the large base.

8. A method of detecting ionizing radiation, wherein the ionizing radiation penetrates via the small base of the scintillator of the detector in claim 1, the detector comprising a device to amplify the electrical signal delivered by the photodetector, the electrical signal being used to detect the ionizing radiation.

9. A method of detecting ionizing radiation, wherein the ionizing radiation penetrates via the small base of the scintillator of the detector in claim 1, the detector comprising a device to amplify the electrical signal delivered by the photodetector, the electrical signal being used to detect the ionizing radiation and in that the positions of the interactions of the ionizing radiation in the scintillator are localized.

10. A method of effecting a time stamping of the interaction of the ionizing radiation in the scintillator, wherein the ionizing radiation penetrates via the small base of the scintillator of the detector in claim 1, the detector comprising a device to amplify the electrical signal delivered by the photodetector, the electrical signal being used to date stamp an interaction of the ionizing radiation in the scintillator.

11. The detector as claimed in claim 1, wherein the large base and the small base are substantially parallel to one another.

12. A detector of ionizing radiation comprising a photodetector and a scintillator in the shape of a truncated cone comprising a large base, a small base and a lateral surface, wherein the large base of the scintillator is coupled to the photodetector, and in that any half-angle at the apex of the cone is in the range of 5° to 35°, the lateral surface being a polished surface, and a black coating is in optical contact with the polished surface and the small base of the scintillator.

13. The detector as claimed in claim 12, wherein in that any half-angle at the apex of the cone of the scintillator is in the range of 15° to 25°.

14. The detector as claimed in claim 12, wherein all the surfaces are polished.

15. The detector as claimed in claim 12, wherein all the surfaces are coated with a black coating except for the face coupled to the photodetector.

16. The detector as claimed in claim 12, wherein the distance between the bases is less than the diameter of the large base.

17. The detector as claimed in claim 12, wherein the large base and the small base are substantially parallel to one another.

18. A detector of ionizing radiation comprising a photodetector and a scintillator in the shape of a truncated cone comprising a large base, a small base and a lateral surface, the large base and the small base being substantially parallel to one another, wherein the large base of the scintillator is coupled to the photodetector, and in that any half-angle at the apex of the cone is in the range of 5° to 35°, the lateral surface being a polished surface, and a black coating is in optical contact with the polished surface and the small base of the scintillator.

\* \* \* \* \*